(12) United States Patent
Marchlewski et al.

(10) Patent No.: US 11,623,698 B2
(45) Date of Patent: Apr. 11, 2023

(54) QUARTER PANEL BRACKET SYSTEM FOR PILLAR ASSEMBLY ADJUSTMENT

(71) Applicant: Ford Global Technologies, LLC, Dearborn, MI (US)

(72) Inventors: Jack Marchlewski, Saline, MI (US); Ted Victor Kolar, Dearborn, MI (US); Ashley Ply, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/502,242

(22) Filed: Oct. 15, 2021

(65) Prior Publication Data

US 2022/0033006 A1 Feb. 3, 2022

Related U.S. Application Data

(63) Continuation of application No. 16/816,444, filed on Mar. 12, 2020, now Pat. No. 11,198,476.

(51) Int. Cl.
*B62D 27/02* (2006.01)
*B62D 25/04* (2006.01)
*B62D 65/02* (2006.01)
*B62D 27/06* (2006.01)

(52) U.S. Cl.
CPC ........... *B62D 27/023* (2013.01); *B62D 25/04* (2013.01); *B62D 65/024* (2013.01); *B62D 27/065* (2013.01)

(58) Field of Classification Search
CPC ...... B62D 25/02; B62D 25/04; B62D 27/023; B62D 62/024; B62D 62/02; B62D 65/024; B62D 65/02

USPC .......................... 296/198, 29, 193.06, 181.1
See application file for complete search history.

(56) References Cited

U.S. PATENT DOCUMENTS

| | | | | |
|---|---|---|---|---|
| 1,050,235 A | * | 1/1913 | Scanlan | F16L 3/00 248/74.1 |
| 3,030,060 A | * | 4/1962 | Breuer | A47H 1/124 248/265 |
| 4,033,531 A | | 7/1977 | Levine | |
| 4,094,416 A | | 6/1978 | Smith | |
| 4,878,528 A | * | 11/1989 | Kobayashi | E06B 9/323 160/902 |
| 4,993,670 A | * | 2/1991 | Tesar | F16L 3/2235 248/74.1 |

(Continued)

FOREIGN PATENT DOCUMENTS

| | | | |
|---|---|---|---|
| JP | 4210834 B2 | 1/2009 | |
| KR | 101714199 B1 * | 3/2017 | ........... B62D 25/145 |
| WO | 2018188219 A1 | 10/2018 | |

*Primary Examiner* — Dennis H Pedder
(74) *Attorney, Agent, or Firm* — Vichit Chea; Carlson, Gaskey & Olds, P.C.

(57) ABSTRACT

An apparatus and method, according to an exemplary aspect includes, among other things, a bracket system having a first portion fixed to a vehicle panel and a second portion that is moveable relative to the first portion for adjustment purposes. At least one first fastener holds the first and second portions together prior to assembly of the vehicle panel to a pillar. The at least one first fastener is loosened to adjust a position of the second portion relative to the pillar. At least one second fastener secures the second portion to the pillar subsequent to adjustment, and the at least one first fastener is tightened subsequent to adjustment to hold the vehicle panel in a desired position relative to the pillar.

21 Claims, 3 Drawing Sheets

(56) References Cited

U.S. PATENT DOCUMENTS

| | | | |
|---|---|---|---|
| 6,585,208 B1 * | 7/2003 | Fraser | ............... E06B 9/323 248/261 |
| 7,137,227 B2 | 11/2006 | Franz | |
| 8,806,815 B1 | 8/2014 | Liu et al. | |
| 9,156,499 B2 | 10/2015 | Mildner et al. | |
| 9,908,574 B2 | 3/2018 | Salamon et al. | |
| 2018/0186417 A1 | 7/2018 | Carroll et al. | |

* cited by examiner

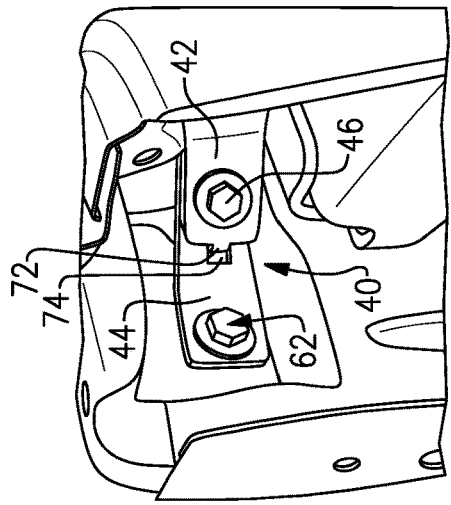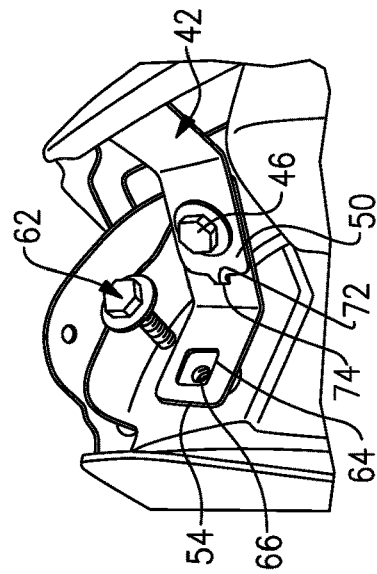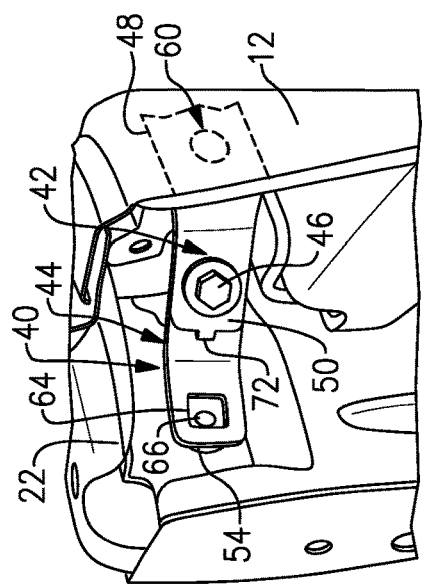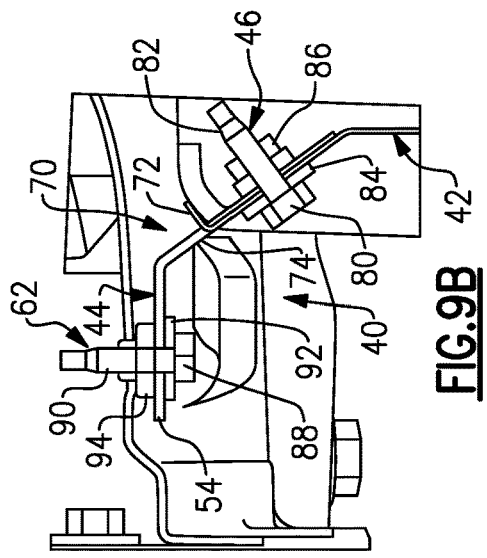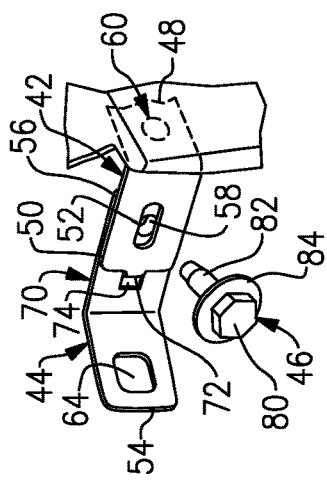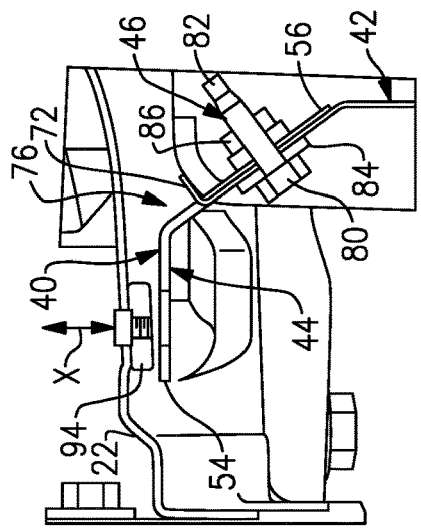

QUARTER PANEL BRACKET SYSTEM FOR PILLAR ASSEMBLY ADJUSTMENT

RELATED APPLICATIONS

This application is a continuation of prior U.S. application Ser. No. 16/816,444, filed Mar. 12, 2020, the entirety of which is herein incorporated by reference.

TECHNICAL FIELD

This disclosure relates generally to a vehicle panel bracket system for pillar assembly adjustment.

BACKGROUND

Vehicles include body panels, such as quarter panels for example, which may be fixture set in a body shop. The position of the quarter panel impacts fit and finish to rear and side closure panels. The position of the quarter panel also impacts fit and finish to other exterior vehicle components such as tail-lights, other body panels, and window panels, for example.

SUMMARY

An apparatus according to an exemplary aspect of the present disclosure includes, among other things, a bracket system having a first portion fixed to a vehicle panel and a second portion that is moveable relative to the first portion for adjustment purposes. At least one first fastener holds the first and second portions together prior to assembly of the vehicle panel to a pillar. The at least one first fastener is loosened to adjust a position of the second portion relative to the pillar. At least one second fastener secures the second portion to the pillar subsequent to adjustment, and the at least one first fastener is tightened subsequent to adjustment to hold the vehicle panel in a desired position relative to the pillar.

In a further non-limiting embodiment of the foregoing apparatus, the vehicle panel comprises a quarter panel.

In a further non-limiting embodiment of any of the foregoing apparatus, an anti-rotation feature couples the first and second portions together.

In a further non-limiting embodiment of any of the foregoing apparatus, the anti-rotation feature comprises at least one tab extending outwardly of one of the first and second portions and at least one elongated opening formed within the other of the first and second portions that receives the at least one tab.

In a further non-limiting embodiment of any of the foregoing apparatus, one of the first and second portions includes an opening to receive the at least one first fastener and the other of the first and second portions includes an elongated slot that overlaps the opening, and wherein the at least one first fastener is inserted through the opening and elongated slot to secure the first and second portions together.

In a further non-limiting embodiment of any of the foregoing apparatus, the at least one elongated opening and the elongated slot are separate from each other.

In a further non-limiting embodiment of any of the foregoing apparatus, one of the first and second portions includes an opening to receive the at least one first fastener and the other of the first and second portions includes an elongated slot that overlaps the opening, and wherein the at least one first fastener is inserted through the opening and the elongated slot to secure the first and second portions together.

In a further non-limiting embodiment of any of the foregoing apparatus, the first portion comprises a first bracket having a first end fixed to the vehicle panel and a second end with a first opening that receives the at least one first fastener, and wherein the second portion comprises a second bracket having a first end to be fixed to the pillar with the at least one second fastener and a second end with a second opening that receives the at least one first fastener.

In a further non-limiting embodiment of any of the foregoing apparatus, one of the first and second openings has a different size and/or shape than the other of the first and second openings to allow for adjustment of the second portion relative to the first portion along a linear path.

In a further non-limiting embodiment of any of the foregoing apparatus, plate bodies of the first and second ends of the second bracket are perpendicular to each other.

In a further non-limiting embodiment of any of the foregoing apparatus, a plate body at the first end of the second bracket is at an oblique angle relative to a plate body at the second end of the second bracket.

An apparatus, according to yet another exemplary aspect of the present disclosure includes, among other things, a bracket system having at least a first bracket and a second bracket that is moveable relative to the first bracket for adjustment purposes, wherein the first bracket has a first end fixed to a quarter panel and a second end with a first opening, and wherein the second bracket has a first end to be fixed to a pillar and a second end with a second opening. At least one first fastener extends through the first and second openings to fix the first and second brackets together prior to assembly of the quarter panel to the pillar. The at least one first fastener is loosened to adjust a position of the second bracket relative to the first bracket to place the quarter panel in a desired position relative to the pillar. At least one second fastener secures the second bracket to the pillar subsequent to adjustment, and wherein the at least one first fastener is tightened subsequent to adjustment to hold the quarter panel in the desired position relative to the pillar.

In a further non-limiting embodiment of any of the foregoing apparatus, an anti-rotation feature couples the first and second portions together.

In a further non-limiting embodiment of any of the foregoing apparatus, the anti-rotation feature comprises at least one tab extending outwardly of one of the first and second brackets and at least one elongated opening formed within the other of the first and second brackets that receives the at least one tab, and wherein the at least one elongated opening is separate from the first and second openings.

In a further non-limiting embodiment of any of the foregoing apparatus, bracket plate bodies of the first and second ends of the second bracket are perpendicular to each other.

In a further non-limiting embodiment of any of the foregoing apparatus, a bracket plate body of the first end of the second bracket is at an oblique angle relative to a bracket plate body of the second end of the second bracket.

A method according to still another exemplary aspect of the present disclosure includes, among other things: securing a bracket system to a vehicle panel, the bracket system having a first portion fixed to the vehicle panel and a second portion that is moveable relative to the first portion for adjustment purposes; tightening at least one first fastener to hold the first and second portions together prior to assembly of the vehicle panel to a pillar; loosening the at least one first fastener to adjust a position of the second portion relative to the first portion to achieve a desired position of the vehicle panel relative to the pillar; securing the second portion to the pillar with at least one second fastener subsequent to adjustment; and re-tightening the at least one first fastener subsequent to adjustment to hold the vehicle panel in the desired position relative to the pillar.

In a further non-limiting embodiment of the foregoing method, the method includes coupling the first and second portions together with an anti-rotation feature.

In a further non-limiting embodiment of any of the foregoing methods, the method includes forming one of the first and second openings to have a different size and/or shape than the other of the first and second openings to allow for adjustment of the second portion relative to the first portion along a linear path.

In a further non-limiting embodiment of any of the foregoing methods, the method includes forming plate bodies of first and second ends of the second portion to be perpendicular to each other, or forming a plate body at a first end of the second portion to be at an oblique angle relative to a plate body of a second end of the second portion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6A is a perspective view of another example of a bracket system as attached to a quarter panel before being installed on a pillar.

FIG. 6B is a section view of the system of FIG. 6A.

FIG. 7 is a perspective view of the system of FIG. 6A being adjusted in a fore/aft direction but prior to insertion of a fastener.

FIG. 8 is a perspective view of the bracket system prior to assembly to a quarter panel.

FIG. 9A is a perspective view of the system of FIG. 6A with the fasteners installed.

FIG. 9B is a section view of the system of FIG. 9A.

DETAILED DESCRIPTION

This disclosure details an exemplary quarter panel bracket system for pillar assembly adjustment. The bracket system provides for adjustment of a vehicle panel relative to a pillar to achieve a desired fit and finish relative to other panels and final installed vehicle components.

Figure 1:
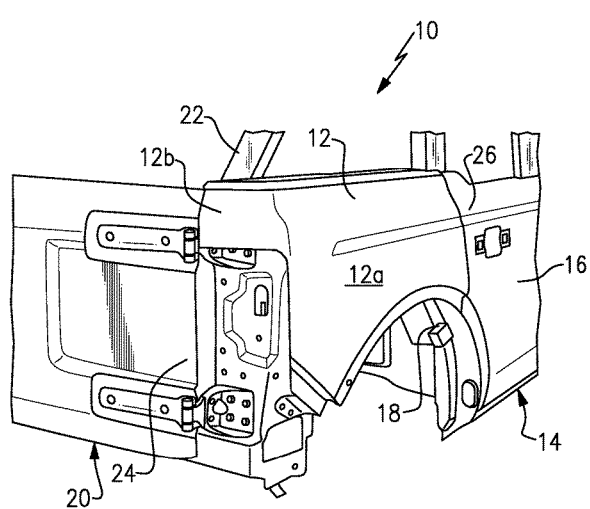
FIG. 1 illustrates a perspective view of a quarter panel to be installed in relation to a pillar.

FIG. 1 shows a vehicle 10 that includes a plurality of vehicle panels that are secured together to provide a vehicle body. In one example, the plurality of vehicle panels includes a quarter panel 12 that is attached to one side 14 of the vehicle 10 behind a vehicle door 16. The quarter panel 12 includes a main portion 12a that extends along the vehicle side 14 and over a wheel well 18. The quarter panel 12 also includes a pillar attachment portion 12b that extends from a rear end of the main portion 12a and wraps around a rear side 20 of the vehicle 10 to be attached to a pillar 22, such as a D-pillar for example.

Figure 2:
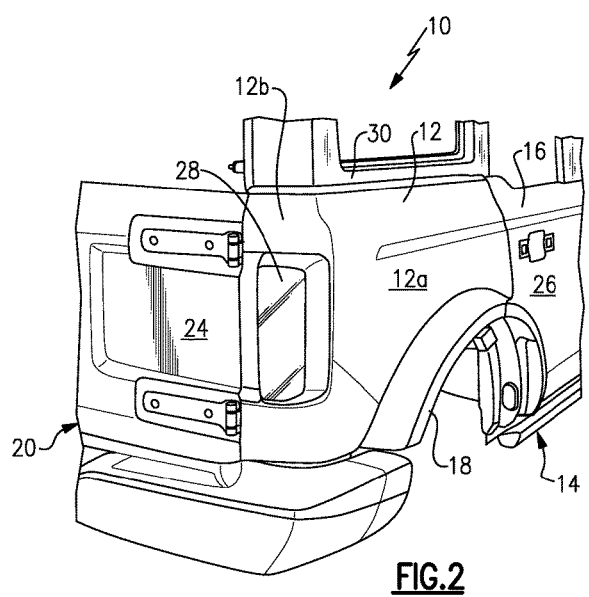
FIG. 2 is the same as FIG. 1 but shows final installed components as positioned relative to the quarter panel.
Figure 4:
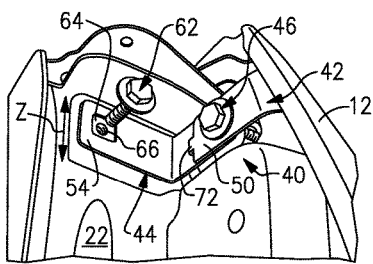
FIG. 4 is a perspective view of the system of FIG. 3A as adjusted in a fore/aft direction but prior to insertion of a fastener.

In one example, the quarter panel 12 is fixture-set in a body shop. A position of the quarter panel 12 impacts fit and finish to a rear closure vehicle panel 24 and a side closure vehicle panel 26 at the vehicle door 16. Additionally, the position of the quarter panel 12 impacts fit and finish to other final installed exterior vehicle components such as a taillight 28 and a pillar panel 30, for example, as shown in FIG. 2. The disclosure provides a bracket system 40 that is used to achieve the desired fit and finish. In order to achieve the desired fit and finish the bracket system 40 should be able to provide for adjustment of the quarter panel 12 in a fore/aft direction relative to the pillar 22 along an X-axis (FIG. 3B) and in a vertical direction along a Z-axis (FIG. 4).

Figure 3A:
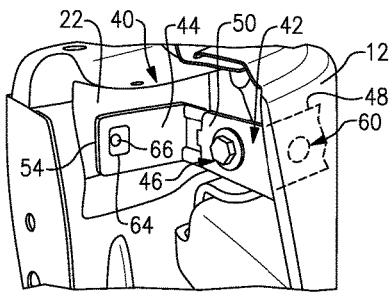
FIG. 3A is a perspective view of a bracket system as attached to a quarter panel before being installed on a pillar
Figure 5A:
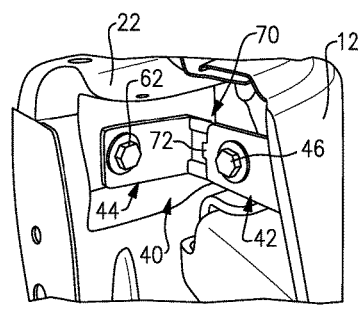
FIG. 5A is a perspective view of the system of FIG. 3A with the fasteners installed.
Figure 3B:
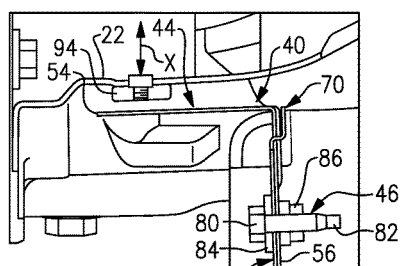
FIG. 3B is a section view of the system of FIG. 3A.
Figure 5B:
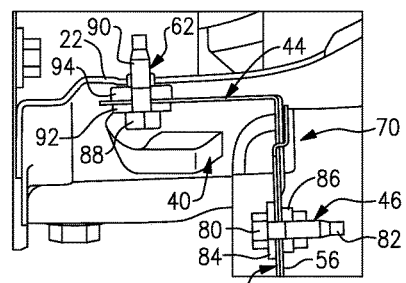
FIG. 5B is a section view of the system of FIG. 5A.

In one example shown in FIGS. 3A-3B, the bracket system 40 includes a first portion 42 fixed to the quarter panel 12 and a second portion 44 that is moveable relative to the first portion 42 for adjustment purposes. At least one first fastener 46 holds the first 42 and second 44 portions together prior to assembly of the quarter panel 12 to the pillar 22. In one example, the first portion 42 comprises a first bracket having a first end 48 fixed to the quarter panel 12 and a second end 50 with a first opening 52 (FIG. 8), and the second portion 44 comprises a second bracket having a first end 54 to be fixed to the pillar 22 and a second end 56 with a second opening 58 (FIG. 8). The first 52 and second 58 openings are positioned in an overlapping relationship with each other.

The at least one first fastener 46 is inserted through the first 52 and second 58 openings to hold the first 42 and second 44 brackets together. The first end 48 of the first bracket 42 is held fixed to the quarter panel 12 by a fixed attachment interface 60 shown schematically in FIG. 3A. The fixed attachment interface 60 can comprises a fastener interface, a welded interface, or any other type of suitable fixed attachment structure.

In one example, the quarter panel 12 is shipped to a body shop with the bracket system 40 fixed to the quarter panel 12 and with the first 42 and second 44 brackets fixed together with the fastener 46. The quarter panel 12 is then loaded into an assembly fixture (not shown) that is used to position the quarter panel 12 relative to the pillar 22. Once the quarter panel 12 is loaded, the fastener 46 is loosened to adjust a position of the second bracket 44 relative to the first bracket 42 and to the pillar 22 to achieve a desired position of the quarter panel 12 relative to the pillar 22.

Once in the desired position, at least one second fastener 62 secures the second bracket 44 to the pillar 22 subsequent to the adjustment. The first fastener 46 is then re-tightened after the adjustment to hold the quarter panel 12 fixed in the desired position relative to the pillar 22.

As such, the subject disclosure provides a compensation bracket system 40 that allows fore/aft and vertical adjustment of the quarter panel 12 at the upper D-pillar attachment area. This bracket system 40 provides for a part and cost reduction as a separate compensator element is not required to be installed on the pillar. Further, this bracket system 40 retains the factory-set position of the upper D-pillar attachment for an end user if the panel is subsequently removed.

In one example, one of the first 52 and second 58 openings has a different size and/or shape than the other of the first 52 and second 58 openings to allow for adjustment. In one example shown in FIG. 8, the first opening 52 in the first bracket 42 comprises an elongated opening or slot that allows for adjustment in both the fore/aft direction along the X-axis and the vertical direction along the Z-axis. The second opening 58 comprises a smaller opening that is formed in the second end 56 of the second bracket 44 and is positioned to overlap with the elongated opening 52 in the first bracket 42. In one example, the second opening 58 can comprise a circular opening or can also comprise an elongated opening or slot. The first fastener 46 is inserted through the aligned openings 52, 58 to secure the brackets 42, 44 together.

The first end 54 of the second bracket 44 includes an additional opening 64 through which the second fastener 62 is inserted. A corresponding pillar opening 66 is formed within the pillar 22 and the bracket opening 64 is aligned with the pillar opening 66. In one example, the additional opening 64 comprises an enlarged opening relative to the size of the pillar opening 66 to allow for adjustment in the vertical direction. In one example, the enlarged opening 64 has a square shape; however, the opening can have other shapes as well.

In one example, an anti-rotation feature 70 couples the first 42 and second 55 brackets together. The anti-rotation feature 70 is separate from the aligned openings 52, 58 of the brackets 42, 44. In one example, the anti-rotation feature 70 comprises at least one finger or tab 72 that extends outwardly of one of the first 42 and second 44 portions and at least one elongated opening 74 formed within the other of the first 42 and second 44 portions that receives the tab 72. In one example, the tab 72 is formed to extend away from the second end 50 of the first bracket 42 and in a direction that is transverse to a plate body of the first bracket 42. In one example, the elongated opening 74 is formed in a plate body of the second bracket 44 and is separate and spaced apart from the second opening 58. The tab 72 is received within the opening 74 and is moveable within the opening 74 when the first fastener 46 is loosened. The elongated opening 52 in the first bracket 42, along with the anti-rotation tab 72, allows the second bracket 44 to adjust in the fore/aft direction when the first fastener 46 is loosened without the bracket 44 falling out of position.

In one example, the first fastener 46 comprises a clamping bolt having an enlarged head portion 80 and a narrower threaded body portion 82. A washer 84 is installed between the enlarged head portion 80 and a surface of the first bracket 42 that surrounds the first opening 52. A threaded nut 86 is fixed to a rear surface of the second bracket 44, and the threaded body portion 82 is threaded into the nut 86 as the first fastener 46 is tightened. When the first fastener 46 is loosened for adjustment purposes, the nut 86 retains the fastener 46 to the bracket system 40 such that the fastener 46 does not fall off.

In one example, the second fastener 62 comprises a clamping bolt having an enlarged head portion 88 and a narrower threaded body portion 90. A washer 92 is installed between the enlarged head portion 88 and a surface of the second bracket 44 that surrounds the opening 64. A threaded nut 94 is fixed to the pillar 22, and the threaded body portion 90 is threaded into the nut 94 as the second fastener 62 is tightened to fix the second bracket 44 to the pillar 22.

In one example, the first bracket 42 comprises a rigid metal plate that provides for flat bracket body surfaces at the first 48 and second 50 ends. In one example, the second bracket 44 comprises a rigid metal plate that provides for flat bracket body surfaces at the first 54 and second 56 ends.

In the example shown in FIGS. 3A-3B, 4, 5A-5B, and 8, the flat plate body portions of the first 54 and second 56 ends of the second bracket 44 are perpendicular to each other (FIG. 3B). In the example shown in FIGS. 6A-6B, 7, and 9A-9B, the flat plate body portion of the first end 54 of the second bracket 44 is at an oblique angle relative to the flat plate body portion of the second end 56 of the second bracket 44 (FIG. 6B). In one example, the flat plate body portion of the first end 54 of the second bracket 44 is orientated at a forty-five degree angle relative to the flat plate body portion of the second end 56. This angled configuration provides for improved tooling access to the attachment interface. This angled configuration includes the same anti-rotation feature and aligned openings as shown in the configuration of FIG. 8.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method comprising:
    (a) securing a bracket system to a vehicle panel, the bracket system having a first portion fixed to the vehicle panel and a second portion that is moveable relative to the first portion for adjustment purposes;
    (b) tightening a first fastener to hold the first and second portions together and form a sub-assembly of the vehicle panel and bracket system;
    (c) loosening the first fastener prior to assembly of the vehicle panel to a pillar to adjust a position of the second portion relative to the first portion to achieve a desired position of the vehicle panel relative to the pillar, wherein the pillar comprises a pillar positioned at a rear of a vehicle and above a tail light, and wherein the vehicle panel comprises a rear quarter panel;
    (d) attaching the sub-assembly to the pillar by securing the second portion to the pillar by inserting a second fastener through the second portion and into a pillar opening in the pillar, and tightening the second fastener in the pillar opening to fix the second portion to the pillar subsequent to adjustment of step (c); and
    (e) re-tightening the first fastener to hold the vehicle panel in the desired position relative to the pillar.

2. The method according to claim 1, including holding the sub-assembly in a fixed position relative to the pillar prior to step (c).

3. The method according to claim 2, wherein the first portion comprises a first bracket having a first end fixed to the vehicle panel and a second end, and wherein the second portion comprises a second bracket having a first end and a second end coupled to the second end of the first bracket with the first fastener to form the sub-assembly comprising the vehicle panel, the first bracket, and the second bracket.

4. The method according to claim 3, wherein the second end of the first bracket includes a first opening, and wherein the second end of the second bracket has a second opening and the first end of the second bracket has a third opening, and wherein step (b) further includes aligning the first and second openings to receive the first fastener, and wherein step (d) further includes aligning the third opening with a pillar opening in the pillar and inserting the second fastener through the third opening, into the pillar opening, and subsequently tightening the second faster to fix the second bracket to the pillar.

5. The method according to claim 4, including forming one of the first and second openings to have a different size and/or shape than the other of the first and second openings to allow for adjustment of the second portion relative to the first portion along a linear path.

6. The method according to claim 4, including forming the third opening to be larger in size than the pillar opening.

7. The method according to claim 4, including coupling the first and second brackets together with an anti-rotation feature that is separate from the first, second, and third openings.

8. The method according to claim 7, wherein the anti-rotation feature comprises at least one finger or tab that extends outwardly of one of the first and second brackets and at least one elongated opening formed within the other of the first and second brackets, the method further including spacing the elongated opening apart from the first, second, and third openings, inserting the at least one finger or tab into the elongated opening such that the at least one finger or tab is moveable within the elongated opening when the at least one first fastener is loosened.

9. The method according to claim 8, wherein the at least one finger or tab extends outwardly from the second end of the first bracket and the at least one elongated opening is formed within the second bracket, and further including positioning the at least one elongated opening to be between the second and third openings of the second bracket.

10. A vehicle component assembly comprising:
a bracket system having a first portion fixed to the vehicle panel and a second portion that is selectively moveable relative to the first portion for adjustment purposes;
a first fastener that holds the first and second portions together and forms a sub-assembly of the vehicle panel and bracket system;
wherein the sub-assembly is aligned with a pillar opening in a pillar such that the second portion is held in a fixed position relative to the pillar and wherein a second fastener is then inserted through the second portion and is tightened into the pillar opening to fix the second portion to the pillar; and
wherein the pillar is positioned at a rear of a vehicle and above a tail light, and wherein the sub-assembly is secured to the pillar with the second fastener.

11. The vehicle component assembly according to claim 10, wherein the first fastener is configured to be loosened prior to assembly of the vehicle panel to the pillar to adjust a position of the second portion relative to the first portion to achieve a desired position of the vehicle panel relative to the pillar, and wherein the sub-assembly is configured to be attached to the pillar by securing the second portion to the pillar with the second fastener subsequent to adjusting the position of the second portion relative to the first portion, and wherein the first fastener is configured to be re-tightened to hold the vehicle panel in the desired position relative to the pillar.

12. The vehicle component assembly according to claim 10, wherein the first portion comprises a first bracket having a first end fixed to the vehicle panel and a second end, and wherein the second portion comprises a second bracket having a first end and a second end coupled to the second end of the first bracket with the first fastener to form the sub-assembly comprising the vehicle panel, the first bracket, and the second bracket.

13. The vehicle component assembly according to claim 12, wherein the second end of the first bracket includes a first opening, and wherein the second end of the second bracket has a second opening and the first end of the second bracket has a third opening, and wherein the first and second openings are aligned to receive the first fastener, and wherein the third opening is aligned with a pillar opening in the pillar to receive the second fastener.

14. The vehicle component assembly according to claim 13, wherein one of the first and second openings has a different size and/or shape than the other of the first and second openings to allow for adjustment of the second portion relative to the first portion along a linear path.

15. The vehicle component assembly according to claim 13, wherein the third opening is larger in size than the pillar opening.

16. The vehicle component assembly according to claim 13, wherein the first and second brackets are coupled together with an anti-rotation feature that is separate from the first, second, and third openings.

17. The vehicle component assembly according to claim 16, wherein the anti-rotation feature comprises at least one finger or tab that extends outwardly of one of the first and second brackets and at least one elongated opening formed within the other of the first and second brackets, and wherein the elongated opening is positioned between the second and third openings of the second bracket, and wherein the at least one finger or tab is inserted into the elongated opening such that the at least one finger or tab is moveable within the elongated opening when the at least one first fastener is loosened.

18. The vehicle component assembly according to claim 10, wherein the vehicle panel comprises a rear quarter panel.

19. The vehicle component assembly according to claim 10, wherein the pillar opening is a threaded opening, and wherein the second fastener has a threaded body portion that is inserted into the threaded opening in the pillar and is tightened to fix the second portion to the pillar.

20. The method according to claim 1, wherein the pillar opening is a threaded opening, and wherein the second fastener has a threaded body portion, and including inserting the threaded body portion into the threaded opening in the pillar and subsequently tightening the second fastener in the pillar opening to fix the second portion to the pillar.

21. A vehicle component assembly comprising:
a first bracket fixed to the vehicle panel;
a second bracket that is selectively moveable relative to the first bracket for adjustment purposes;
a first fastener that holds the first and second portions together and forms a sub-assembly of the vehicle panel and the first and second brackets;
a pillar including a pillar opening, wherein the sub-assembly is positioned adjacent to the pillar such that the second bracket is aligned with the pillar opening, and wherein the pillar is positioned at a rear of a vehicle and above a tail light, and wherein the vehicle panel comprises a quarter panel; and a second fastener having a threaded body that is threaded into the pillar opening to fix the second bracket to the pillar.

* * * * *

UNITED STATES PATENT AND TRADEMARK OFFICE
CERTIFICATE OF CORRECTION

| | | |
|---|---|---|
| PATENT NO. | : 11,623,698 B2 | Page 1 of 1 |
| APPLICATION NO. | : 17/502242 | |
| DATED | : April 11, 2023 | |
| INVENTOR(S) | : Marchlewski et al. | |

It is certified that error appears in the above-identified patent and that said Letters Patent is hereby corrected as shown below:

In the Claims

Claim 10 – Column 7, Lines 45-46 – change "the vehicle panel" to -- a vehicle panel --

Claim 13 – Column 8, Line 19 – change "a pillar opening" to -- the pillar opening --

Claim 21 – Column 8, Line 58 – change "the vehicle panel" to -- a vehicle panel --

Claim 21 – Column 8, Line 61 – change "first and second portions" to -- first and second brackets --

Signed and Sealed this
Sixteenth Day of May, 2023

*Katherine Kelly Vidal*

Katherine Kelly Vidal
*Director of the United States Patent and Trademark Office*